United States Patent [19]

Boghosian et al.

[11] 3,888,782

[45] June 10, 1975

[54] SOFT CONTACT LENS PRESERVING SOLUTION

[75] Inventors: Malcolm P. Boghosian, Long Beach; Milagros V. Blanco, Yorba Linda, both of Calif.

[73] Assignee: Allergan Pharmaceuticals, Irvine, Calif.

[22] Filed: May 8, 1972

[21] Appl. No.: 250,931

[52] U.S. Cl. ............... 252/106; 252/542; 252/544; 424/80; 424/81; 424/326
[51] Int. Cl. ............................................. C11d 3/48
[58] Field of Search ........... 252/542, 544, 524, 525, 252/106; 424/78, 80, 81, 326

[56] References Cited
UNITED STATES PATENTS

| | | | |
|---|---|---|---|
| 2,990,425 | 6/1961 | Senior | 252/544 |
| 3,311,577 | 3/1967 | Rankin | 424/78 |
| 3,549,747 | 12/1970 | Krezanowski et al. | 424/78 |
| 3,577,516 | 5/1971 | Gould et al. | 424/81 |
| 3,681,089 | 8/1972 | Gould et al. | 424/78 |
| 3,689,673 | 9/1972 | Phares | 424/326 |
| 3,755,561 | 8/1973 | Rankin | 424/78 |
| 3,767,788 | 10/1973 | Rankin | 424/78 |

*Primary Examiner*—Benjamin R. Padgett
*Assistant Examiner*—E. A. Miller
*Attorney, Agent, or Firm*—Martin A. Voet

[57] ABSTRACT

An aqueous, substantially isotonic cleaning and sterilizing solution for plastic hydrophilic soft contact lenses containing as active ingredients, chlorhexidine and polyvinylpyrrolidone. The foregoing sterlizing solution is non-toxic to the eye of the wearer of the soft contact lens and in the presence of a suitable amount of water soluble polyhydroxyethylmethacrylate prevents the build-up of opaque deposits on the surface of the soft contact lens.

7 Claims, No Drawings

SOFT CONTACT LENS PRESERVING SOLUTION

BACKGROUND OF THE INVENTION

Hydrophilic or partially hydrophilic plastic materials have been described for use in making contact lenses. For example, U.S. Pat. No. 3,503,393 to Seiderman and U.S. Pat. No. 2,976,576 to Wichterle describes processes for producing three dimensional hydrophilic polymers in aqueous reaction media having a sparingly cross-linked polymeric hydrogel structure and having the appearance of elastic, soft, transparent hydrogels.

The main virtues of these lenses is their softness and optical suitability. The lenses are particularly useful in ophthalmology due to their remarkable ability to absorb water with a concomitant swelling to a soft mass of extremely good mechanical strength, complete transparency and the ability to retain shape and dimensions when equilibrated in a given fluid.

One of the problems connected with these "soft" contact lenses is the method of their sterilization and cleaning. The very property of the soft lenses which allows them to absorb up to 150 per cent by weight of water also allows preservatives which might otherwise be used for cleaning and sterilization to be absorbed and even concentrated and later released when the soft contact lens is on the eye. This can have the harmful result of damaging or staining the contact lens itself and/or harming the sensitive tissues of the conjunctivae or cornea.

Hard contact lenses do not absorb appreciable amounts of water (i.e., 0.1–0.4%) and thus the use of effective preservatives does not create a problem in the hard contact lens field. As stated in the medical publication "Highlights of Ophthalmology," Vol. XII, Nov. 3, 1969, sterilization and cleaning of soft contact lenses is presently carried out by boiling the lenses in water for 15 minutes; a rather inconvenient and dangerous operation. Furthermore, users of soft contact lenses are warned that under no circumstances should solutions designed for hard contact lenses be used, for the reason that the preservatives in such solutions will be absorbed and even concentrated by the soft lens and may seriously damage the soft lens and/or the eye of the user.

It has been discovered that the substance, 1,6-di-(N-p-chlorophenyldiguanido) hexane, known as chlorhexidine, and known to be highly effective against both Gram negative and Gram positive microorganisms, may be used for sterilizing hydrophilic plastic soft contact lenses. However, the use of chlorhexidine with soft contact lenses has presented several problems. While chlorhexidine solutions containing as much as 0.1% chlorhexidine salts have no toxic effect upon the human or animal eye, soft contact lenses soaked in solutions containing 0.01% chlorhexidine salts have been found to cause corneal damage on rabbit eyes, the occurence and extent of damage being dependent on the concentration of the chlorhexidine in solution. The foregoing appears to result from the characteristic property of the soft contact lenses to absorb and even concentrate otherwise non-toxic substances, rendering such substances toxic when used as soaking solutions for soft contact lenses.

A second problem connected with the use of chlorhexidine as a sterilizing agent for soft contact lenses has also been discovered. We have found that over a period of time, opaque materials will deposit on the surface of the soft contact lenses. This deposit is firm and is not inhibited or removed by chlorhexidine. We have discovered that the build-up of this material is gradual, though ultimately rendering the lens opaque. Furthermore, even before the lens becomes opaque, the wearer of the lens finds that the lens becomes increasingly more uncomfortable to wear due to increasing irritation to the eye caused by the gradual build-up on the surface of the lens. We have also discovered that the material will deposit on the soft lenses even if the lenses are soaked or boiled in normal saline.

SUMMARY OF THE INVENTION

It has now been unexpectedly discovered that plastic hydrophilic soft contact lenses may be effectively cleaned, sterilized and used wihtout deleterious effect to the lenses or the eyes of the user and that formation of deposits on the surface of the lens may be prevented by the present invention which provides a sterile, aqueous, substantially isotonic cleaning and sterilizing solution for plastic hydrophilic soft contact lenses comprising as active ingredients, effective amounts of chlorhexidine and polyvinylpyrrolidone.

The present invention also relates to a sterile, aqueous, substantially isotonic cleaning and sterilizing solution for plastic hydrophilic soft contact lenses comprising the above described solution in combination with an effective amount of water soluble polyhydroxyethylmethacrylate.

The present invention further relates to a method of maintaining plastic hydrophilic soft contact lenses substantially free from surface deposits comprising contacting the soft contact lenses with the above-described solution for a time sufficient to render the lenses substantially sterile.

DESCRIPTION OF THE INVENTION

Chlorhexidine is 1,6-di-(N-p-chlorophenyldiguanido) hexane. This compound is available under the Tradename "Hibitane" and it can be obtained in several adduct salts such as the diacetate, digluconate, dihydrochloride, etc.

Chlorhexidine is distinguished by its wide range of antibacterial activity, being highly effective against both Gram positive and Gram negative organisms. However, it is not effective against fungi in short contact periods i.e., 6 hours. Isotonic solutions containing 0.005% chlorhexidine diacetate or digluconate have adequate activity to reduce innoculums of $10^5$ cells per ml. of *Staphylloccocus aureus*, *Pseudomonas aeriginosa*, *Escheria coli* and *Candida albicans* down to less than $10^2$ cells per ml. within 6 hours of contact, as further disclosed in the EXAMPLES herein.

The amount of chlorhexidine salt which may be used in the present invention ranges from about 0.001 to about 0.05% and preferably about 0.005 to about 0.01% by weight of the aqueous isotonic solution.

The polymer polyvinylpyrrolidone (PVP) is polymeric N-vinylpyrrolidone as described in U.S. Pat. No. 2,265,450. It may be obtained in various degrees of polymerization designated by Fichentscher K value. The preferred grade used in the formulations is the pharmaceutical grade with an average molecular weight of 40,000. It is available from GAF Corp. under the trademark "Plasdone K-29-32."

The amount of PVP which may be used in the present invention ranges from about 0.5 to 5 and preferably about 1 to 2% by weight of the aqueous isotonic solution.

It is known in the prior art that PVP possesses detoxifying properties e.g. U.S. Pat. Nos. 3,216,579 and 2,964,447 and related patents. These prior art references indicate that the PVP binds with the otherwise toxic agent e.g. mercury containing compound or iodine or other toxic agent, and slowly releases the otherwise toxic agent in a manner such that no toxic effects are produced. However, as shown in the EXAMPLES, the detoxifying effect of PVP in the present invention does not result from the binding by PVP of the otherwise toxic substance chlorhexidine. The mechanism by which PVP detoxifies the effects of chlorhexidine in the soft contact lenses is not shown.

The water soluble polyhydroxyethylmethacrylate described herein is soluble in alkaline water, the solubility varying with the alkalinity of the water and also on the degree of polymerization. The preferred grade is the polymer with an average molecular weight of about 60,000 to 700,000 and preferably having an average molecular weight of about 80,000 to 225,000. These polymers are available from Hydron Laboratories, e.g. under the trademark "Hydron Biomedical Polymer, Type Al." The amount of polyhydroxyethylmethacrylate which may be used in the present invention varies from about 0.001 to about 2.0 and preferably from about 0.01 to about 0.1% by weight of the aqueous, isotonic solution.

The water soluble polyhydroxyethylmethacrylate described herein has been found to substantially prevent the accumulation of deposits on the surface of the soft contact lenses. The manner in which this polymer prevents the formation of the deposits on the surface of the soft contact lenses is not known.

A typical composition of the present invention may contain, in addition to the active ingredients described earlier, lubricants to aid in making the ophthalmic cleaning and sterilizing composition more comfortable to the user.

Suitable buffers or stabilizers may also be used and include sodium or potassium citrate, citric acid, various mixed phosphate buffers and $NaHCO_3$. Generally $NaHCO_3$ may be used in amounts ranging from about 0.05 to 2.5% and preferably 0.1 to 1.5 by weight, the narrow limits resulting from the pH effect of the $NaHCO_3$. With suitable buffering agents, greater amounts of $NaHCO_3$ might be used.

Furthermore, other non-toxic agents suitable for use in sterilizing soft contact lenses may also be used to improve the range of microorganisms killed by the composition or improve the speed of killing. Examples of other non-toxic agents include suitable amounts of thimerosal and phenylmercuric salts such as phenylmercuric nitrate (PMN) and phenylmercuric acetate (PMA). The components may be used in amounts which are non-toxic and which generally vary from about 0.001 to about 0.1% by weight of the aqueous solution.

The treating solution for contact lenses is maintained at physiological saline, i.e., substantially isotonic, or approximately 0.9% saline, or with suitable agents alone or in combination to render the solution substantially isotonic. Hypotonic solution, e.g., tapwater, will cause the lens to adhere tightly to the cornea while hypertonic solutions (excess saline) will result in stinging, lacrimation and a red eye.

It should be understood that the foregoing description of the amounts of the various compounds which may be used in the present invention are stated in percentage of ingredients in solution. The formulation may also take the form of one or more conventional solid dosage forms such as tablets suitable for use in a measured quantity of a suitable solvent such as water. The percentage composition of the solid dosage forms is such that when dissolved in a specified volume of water, the solution will have the percentage composition within the ranges set forth in the specification. If solid dosage forms are used, the formulation may include conventional lubricants, binders, and excipients which include glycerol, sorbitol, boric acid, propylene glycol, polyethylene glycols, dextran, methylcellulose, hydroxyethylcellulose, water soluble salts of carboxymethylcellulose, or naturally occurring hydrophilics such as geletin, alginates, tragacanth, pectin, acacia and soluble starches. These materials are used in amounts varying between 0.01 and 10 and preferably between about 0.1 and 5 weight per cent.

The method of use of the sterilizing and cleaning solution is the following. The wearer of the soft contact lenses removes them from his eyes and places them in a suitable container with sufficient amount of the composition of the present invention to cover the lenses. The lenses are allowed to soak for at least about 30 minutes and preferable 2 to 8 hours to achieve 99.9% kill of spores, fungis and yeasts. This soaking has been shown to effectively clean and sterilize the lenses.

The word "sterilize" is used in the present invention to mean the rendering non-viable of substantially all pathogenic bacterial of the type typically found including Gram negative and Gram positive bacterial as well as fungi, except as indicated.

The present invention may be further described and ilustrated with the reference to the following EXAMPLES. It is to be understood that the following EXAMPLES are for the purpose of illustration and the invention is not to be regarded as limited to any of the specific compounds or formulations or conditions recited therein. Unless otherwise stated "parts" is parts by weight.

EXAMPLE I

The toxicity of buffered isotonic solutions of chlorhexidine diacetate and chlorhexidine digluconate used with plastic hydrophilic soft contact lenses was determined by simulating a user's daily wear of lenses on rabbit eyes.

Twelve hydrophilic plastic soft contact lenses were soaked overnight in isotonic, buffered solutions having chlorhexidine diacetate concentrations as indicated in Table 1, and in the morning were fitted in the left eyes of 12 adult New Zealand albino rabbits for approximately 6–7 hours' wearing time. Prior to resoaking each evening, the lenses were washed with isotonic saline. The animals were observed regularly for possible lens rejection and irritation of the eye mucosa. Two lenses were soaked in each of the solutions shown in Table 1.

Ocular irritation was determined by staining the experimental and control eyes with one drop of 2% Fluorescein and observing for possible corneal damage under U.V. light.

Observations:

The results of the study are tabulated in Table 1.

Table 1

| % Concentration of Chlorhexidine diacetate | No. of days lens was in rabbits eyes | Description of damage (both test rabbits unless otherwise indicated) |
|---|---|---|
| 0.01 | 2 | Corneal damage, with stippling, chemosis and severe discharge |
| 0.009 | 1–2 | Severe conunctival irritation, discharge and chemosis |
| 0.008 | 7 | Corneal lesions, hyperemia |
| 0.007 | 4 | Conjunctival irrigation with stippling effect |
| 0.006 | 12 | Corneal damage |
| 0.005 | 15 | 1 rabbit had corneal damage |

EXAMPLE II

By incorporating polyvinylpyrrolidone in a chlorhexidine solution, the toxic effect of the chlorhexidine under the plastic hydrophilic soft contact lenses as shown in EXAMPLE I was greatly diminished and in some cases completely prevented. The detoxifying amount of polyvinylpyrrolidone was determined by combining different amounts of PVP with an otherwise toxic concentration of chlorhexidine as follows: PVP was dissolved in an amount of distilled water sufficient to dissolve the PVP. The chlorhexidine diacetate was then added. Balanced salts and phosphate buffer were added in aqueous solution in an amount sufficient to bring the mixture to the desired concentration. The toxicity testing procedure described in EXAMPLE I was followed. The results are shown in Table 2 below:

Table 2

| % Concentration PVP | Chlorhexidine | Number of days lens was in Rabbits eyes | Description of damage |
|---|---|---|---|
| 0.01 | 0.01 | 1 | Corneal stippling |
| 0.1 | 0.01 | 26 | Mild conjunctival hyperemia |
| 0.2 | 0.01 | 26 | Mild conjunctival hyperemia. On the 5th day one of 5 rabbits had corneal damage |
| 1.0 | 0.005 | 79 | No ocular toxicity |
| 2.0[1] | 0.01 | 14, 24, 30 | No ocular toxicity |

[1]Three batches of the solution containing 2.0% polyvinylpyrrolidone was prepared at three different times, then toxicity determined in three independent studies for confirmatory purpose. No ocular toxicity was observed in all three cases.

EXAMPLE III

The following tests were made to determine if the detoxifying property of polyvinylpyrrolidone (PVP) with chlorhexidine relates to the known binding or complexing property of PVP. Solutions were prepared using differing amount of PVP and chlorhexidine in distilled water. 50 ml of each of the solutions to be tested was transferred into cellulose dialysis bags having a diameter of 1⅞ inches and an average pore radius of 24A. (designed to retain substances having a molecular weight equal to or greater than 14,000). The bags were placed in suitable containers containing 400 ml of distilled water. The water was continuously stirred during the test. After 24 hours, 48 hours and 120 hours, 3.0 ml samples of the liquid outside each bag were taken. The water outside the bags was replaced with fresh distilled water after each sample was taken.

The average molecular weight of the PVP used in this EXAMPLE was approximately 40,000 and the molecular weight of the chlorhexidine is 505.5. Therefore, during the dialysis, any unbound chlorhexidine would be expected to diffuse out of the bag. The foregoing samples were analyzed for chlorhexidine by direct UV measurement. Chlorhexidine exhibits a maximum absorbance at 253 millimicrons, and the absorbance at that wave length follow Beer's Law.

Table 3 tabulates the results of the analysis.

Table 3

| Solution | % PVP[1] | Chlorhexidine[2] % | (mg) | Total amount Chlorhexidine recovered in external liquid % | (mg) |
|---|---|---|---|---|---|
| A | 2.0 | 0.01 | (5.05) | 98 | (4.9) |
| B | 0.5 | 0.01 | (5.05) | 100 | (5) |
| C | 0.05 | 0.01 | (5.05) | 90 | (4.5) |
| D | 0.05 | 0.005 | (2.52) | 91.5 | (2.26) |
| E | 0.5 | 0.005 | (2.52) | 92 | (2.3) |

[1]PVP: MW about 40,000
[2]Chlorhexidine: gluconate salt, B.P. (20% w/v).

The foregoing Table 3 indicates that essentially all of the chlorhexidine had dialyzed through the bags indicating that there was essentially no binding between PVP and chlorhexidine.

EXAMPLE IV

Formulations containing 0.01% and 0.005% chlorhexidine digluconate and 2.0% polyvinylpyrrolidone were tested for antimicrobial activity to determine if the presence of a 2% concentration of PVP decreased the antimicrobial activity of chlorhexidine. The tests indicated that the formulations retained adequate sterilizing activity.

EXAMPLE V

During toxicity studies on rabbit eyes using plastic hydrophilic soft contact lenses, it was observed that lenses were turning opaque after several days. Both lenses soaked in isotonic saline control and lenses soaked in the test solutions were developing white deposits on the surface of the lenses. The deposits began as tiny white spots along the periphery of the lens finally developing into a complete coating of the lens, thereby making the lens completely opaque. The deposits were strongly attached to the surface of the lens; they could not be removed by gentle rubbing with the tips of the fingers under tapwater or by boiling in isotonic saline solution. Results obtained from clinical studies conducted with volunteer human contact lens wearers indicated that as the deposits built up on the surface of the lens, the patient experienced a great deal of discomfort as well as blurring of vision.

Tests were conducted to determine the chemical nature of the white deposit. The tests involved acid hydrolysis of soft lenses containing the deposits using 5 N hydrochloric acid for a period of 16 hours at 145°C. 10 microliter of the final hydrolysate was spotted on silica gel plate. The spots were dried, and then sprayed with Ninhydrin Reagent.

The test results were positive for the presence of amino acids, indicating that the deposits most likely contained proteinaceous material. Contact lenses which had not been worn were similarly tested and tested negative for amino acids. Based on tests of this EXAMPLE, it has been hypothesized that protein from the tears may be attaching to the surface of the soft lens causing the deposits.

EXAMPLE VI

Various solutions of chlorhexidine digluconate were tested on rabbit eyes using hydrophilic soft contact lenses following the toxicity testing procedure described in EXAMPLE I plus observing and analyzing the lens for protein deposits. The amount of protein deposited was reported as follows:

Type I— Positive by chemical analysis only
Type II— Can be detected using a dissecting microscope but not by the naked eye
Type III— Can easily be seen by the naked eye
The solutions tested were as follows:

|    |    | Parts |
|----|----|-------|
| A. | Chlorhexidine digluconate | 0.01 |
|    | Polyvinylpyrrolidone[1] | 2.0 |
|    | Aqueous, isotonic, buffered solution (pH 7) | 97.99 |
| B.[2] | Chlorhexidine gluconate | 0.005 |
|    | Disodium edetate in isotonic buffered solution (pH 7.6) | 99.995 |
| C.[3] | Chlorhexidine gluconate | 0.005 |
|    | Thimerosal | 0.002 |
|    | Isotonic solution (pH 7.4) | 99.993 |
| D.[4] | Chlorhexidine digluconate | 0.005 |
|    | Polyvinylpyrrolidone[1] | 1.0 |
|    | Polyhydroxyethylmethacrylate[5] | 0.04 |
|    | Isotonic, buffered solution (pH 7.4) | 98.955 |

[1]Polyvinylpyrrolidone: Molecular weight 40,000.
[2]Barnes-Hind "Hexaphen" soft contact lens sterilizing solution (composition taken from label).
[3]Burton-Parson's "Flexsol" soft contact lens sterilizing solution (composition taken from label).
[4]Formulation D prepared as follows: PVP was dissolved in an amount of distilled water sufficient to dissolve the PVP. The chlorhexidine digluconate was then added. The polyhydroxyethylmethacrylate was separately dissolved in an aqueous sodium bicarbonate solution and then combined and mixed well with the PVP containing solution. Balanced salts and phosphate buffer were added in aqueous solution in an amount sufficient to bring the mixture to the desired concentration.
[5]Polyhydroxyethylmethacrylate: water soluble, having a molecular weight of 124,500 as determined by Hewlet-Packard Model 502 membrane osmometer.

The results are tabulated in Table 4.

Table 4

| Solution | Number of Days of Test | Type of Protein Deposit |
|----------|------------------------|-------------------------|
| A | 21 | One lens out of six had Type III, the rest were clear. |
| B | 13 | Four lenses out of six had Type II, the rest were clear. |
| C | 12 | Three lenses out of six had Type II, the rest were clear. |
| D | 79 | All lenses were clear. |

The results of Table 4 demonstrate that the addition of the water soluble grade of polyhydroxyethylmethacrylate prevented the attachment of deposits onto the surface of the soft lenses, thereby making the detoxified Chlorhexidine solution useful as both a sterilizing and cleaning solution for the hydrophilic soft contact lenses.

EXAMPLE VII

The antimicrobial activity of Solution D of EXAMPLE VI was tested and compared with an isotonic buffered solution of 0.005% Chlorhexidine. The two solutions exhibited the same antimicrobial activity, reducing the innoculums of $10^5$ cells per ml. of *Staphyloccocus aureus*, *Pseudomonas aeruginosa*, *Excheria coli* and *Candida albicans* down to less than $10^2$ cells per ml. within 6 hours contact. However, further tests using varying amounts of polyhydroxyethylmethacrylate at concentrations between 0.05% to 0.1% tended to reduce somewhat the antimicrobial activity of Chlorhexidine within the 6-hour sterilizing time.

EXAMPLE VIII

The following tests were made to show that the presence of water soluble polyhydroxyethylmethacrylate prevents the uptake of chlorhexidine into the soft lens.

Plastic hydrophilic soft contact lenses were soaked in 10.0 ml of each of the formulations set forth in Table 5. Duplicate runs were made for each formulation. After soaking 3, 8, and 24 hours, the lenses were removed from each solution and the solution were submitted for analysis for remaining chlorhexidine. The analytical method used was colorimetric after reaction with a standard hypochlorite solution. Table 6 tabulates the results.

Table 5

| Formulation | | |
|---|---|---|
| A[1] | 0.005% | Chlorhexidine gluconate |
|      | 99.995% | isotonic aqueous solution |
| B[2] | 0.005% | chlorhexidine |
|      | 0.001% | thimerosal |
|      | 99.994% | isotonic aqueous solution |
| C    | 0.005% | chlorhexidine gluconate |
|      | 2.0%   | PVP[3] |
|      | 1.8%   | propylene glycol |
|      | 96.193 | distilled water |
| D    | 0.005% | chlorhexidine gluconate |
|      | 0.04%  | polyhydroxyethylmethacrylate[4] |
|      | 1.0%   | PVP[3] |
|      | 98.955 | aqueous isotonic solution |

[1]Commercial soft lens formulation "Hexaphen"-Barnes Hind
[2]Commercial soft lens formulation "Normol"-Burton-Parsons
[3]PVP - Molecular weight about 40,000.
[4]Polyhydroxyethylmethacrylate - water soluble, having a molecular weight of 124,500 as determined by Hewlet-Packard Model 502 membrane osmometer.

Table 6

| Solution | % uptake of chlorhexidine in soft lens |
|----------|----------------------------------------|
| A | 40–44 |
| B | 35–40 |
| C | 40–44 |
| D | 6–10 |

The results shown in Table 6 clearly indicate that the formulation containing the polyhydroxyethylmethacrylate substantially reduces the uptake of chlorhexidine by the soft lens.

We claim:

1. A sterile, non-toxic cleaning and sterilizing solution for plastic hydrophilic soft contact lenses comprising about 0.001 to about 0.05% chlorhexidine and about 0.5 to about 5% polyvinylpyrrolidone.

2. The solution of claim 1 wherein the chlorhexidine is in the form of a water soluble salt thereof.

3. The solution of claim 2 wherein the chlorhexidine salt is selected from the group consisting of chlorhexidine diacetate, chlorhexidine digluconate and chlorhexidine dihydrochloride.

4. The solution of claim 1 wherein the polyvinylpyrrolidone has an average molecular weight of about 40,000.

5. The solution of claim 1 additionally containing about 0.001 to about 0.005% thimerosal.

6. The solution of claim 1 additionally containing from about 0.01 to about 0.1% water soluble polyhydroxyethylmethacrylate having an average molecular weight between about 60,000 and about 700,000.

7. A sterile, aqueous, substantially isotonic nontoxic cleaning and sterilizing solution for plastic hydrophilic contact lenses comprising as active ingredients between about 0.005 and 0.01% weight of chlorhexidine digluconate and between about 1 and 2% polyvinylpyrrolidone having an average molecular weight of about 40,000.

* * * * *